PROCESS FOR PREPARING 1,2-ETHANEDITHIOL
Jane O. Fournier and Delbert D. Reynolds, Rochester, N.Y., assignors to Eastman Kodak Company, Rochester, N.Y., a corporation of New Jersey
No Drawing. Filed June 7, 1961, Ser. No. 115,296
5 Claims. (Cl. 260—609)

This invention relates to a novel process for preparing 1,2-ethanedithiol.

It is known that 1,2-ethanedithiol can be prepared by reacting an alkylene halide with an alkali metal hydrosulfide. However, good yields are prevented by the formation of by-products, for example, polymeric materials. Formation of these by-products has been reported as minimized by running the reaction in an autoclave under $H_2S$ pressure. Another known method involves alkaline decomposition of the isothiuronium salt of ethylene bromide and thiourea. While this process does give moderate yields of dithiols of the general formula $$HS-(CH_2)_n-SH$$

where $n$ is 3 or more, for example, 1,3-propanedithiol, 1,4-butanedithiol, etc., it has offered difficulties in the production of lower members of the series, i.e. for the production of 1,2-ethanedithiol. Another reported method involves the reaction of ethylene sulfide with $H_2S$ in methanol to give a yield of about 49 percent of 1,2-ethanedithiol. But here also higher molecular weight materials are obtained amounting to about 20 percent. Still other processes that have been reported have not been practical for one reason or another. Accordingly, it would be very desirable to provide a means both simple and efficient for producing 1,2-ethanedithiol and at the same time be free of disadvantageous by-products.

We have now found that alkyl 2-mercaptoethyl carbonates having the general formula:

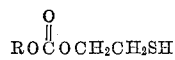

wherein R represents an alkyl group of from 1–8 carbon atoms, e.g. methyl, ethyl, propyl, isopropyl, n-butyl, sec. butyl, pentyl, hexyl, 2-ethylhexyl, etc. groups, can be smoothly and efficiently reacted with a basic hydrosulfide of the type MSH, wherein M stands for the group $NH_4$ or an alkali-metal atom such as ammonium hydrosulfide, lithium hydrosulfide, sodium hydrosulfide, potassium hydrosulfide, etc., to give a minimum of by-products and 1,2-ethanedithiol of better than 99 percent purity and in yields of from 68–80 percent based on the weight of the alkyl 2-mercaptoethylcarbonate employed. The product, 1,2-ethanedithiol, is useful for example in the rubber industry, in pharmaceutical preparations and in photographic materials and processes.

It is, accordingly, an object of the invention to provide a novel and greatly improved method for the preparation of 1,2-ethanedithiol. Other objects will become apparent hereinafter.

More specifically, we prepare 1,2-ethanedithiol preferably by adding an alkyl 2-mercaptoethylcarbonate as above defined in portions over a period of 30 minutes or more to a solution made alkaline, i.e. having a pH above 6.8, with a base represented by the general formula MOH, wherein M is as previously defined, for example, ammonium hydroxide or an alkali-metal hydroxide such as lithium, sodium, potassium, etc. hydroxides, and containing from 1–5 moles, but preferably from 1–2 moles of the ammonium hydrosulfide per mole of the alkyl 2-mercaptoethylcarbonate, the reaction mixture being stirred and maintained at 5–10° C. during the entire addition period. The mixture at this point may advantageously be saturated with hydrogen sulfide by passing the gas therethrough for about 2 hours or more. The stirring can be continued about from 10–20 hours, or even longer, while keeping the temperature at about 15–30° C. The mixture is then cooled, acidified with a strong acid such as hydrochloric, sulfuric, phosphoric, etc. acids and the product, 1,2-ethanedithiol, is then separated therefrom by conventional means such as by distillation or by extraction with a water-immiscible volatile solvent such as chloroform, benzene, and the like, followed by removal of the solvent by evaporation, but preferably by a combination of both means, i.e. by fractional distillation of the dried extract. The process wherein ethyl 2-mercaptoethyl carbonate and ammonium hydrosulfide are used is outstanding and is preferred.

The above-described reaction is thought to involve (1) the generation of ethylene sulfide, followed by (2) its reaction with the hydrosulfide and (3) the liberation of the 1,2-ethanedithiol by acid treatment. These steps are represented by the following general equations:

(1) 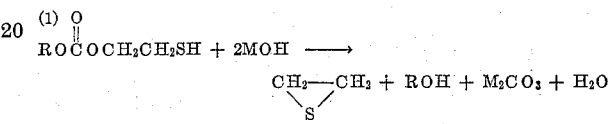

(2) 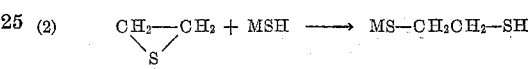

(3) 

wherein R, M and HX are as previously defined. While the base is shown in the above equations as 2 moles per mole of the alkyl 2-mercaptoethylcarbonate, the quantity is not critical since the reaction mixture need only be alkaline, but preferably a ratio of from 1–5 moles of the base compound is employed per mole of the said carbonate. The acidifying acid HX need be used only in sufficient amount to make the reaction mixture acid, but preferably to adjust it to a pH of from about 1–5. The overall temperature range can vary from about 0–30° C. for satisfactory operability. The reaction medium is advantageously a water-miscible inert solvent such as, for example, acetone, methanol, ethanol, propanol, etc. or aqueous solutions thereof. The concentration of the reactants in the solvent medium can vary from amounts as low as 5%, but for maximum efficiency a concentration of from about 25–60% is employed. The reaction is preferably carried out at ordinary atmospheric pressures, but, if desired, pressures higher than atmospheric can also be employed. It is also within the scope of the invention to vary the order of addition of the reactants, for example, the alkyl 2-mercaptoethylcarbonate can first be added to the base solution followed by passing $H_2S$ into the mixture.

Suitable alkyl 2-mercaptoethylcarbonates for practicing the invention include the ethyl, propyl, isopropyl, n-butyl, sec. butyl, pentyl, hexyl, 2-ethylhexyl, etc. 2-mercaptoethylcarbonates. These can be readily prepared, for example, by reacting the appropriate alkyl chloroformates with 2-mercaptoethanol, at reflux temperatures, in the ratio of about 2 moles of the alkyl chloroformate to each mole of the 2-mercaptoethanol. For further details of the preparation, reference can be had to copending application of Donald L. Fields et al., Serial No. 115,932, filed June 9, 1961.

The invention is illustrated further by the following examples and description.

*Example 1*

A 3-l. three-necked round-bottomed flask, immersed in an ice-salt bath, was fitted with a sealed paddle stirrer, a gas inlet tube extended below the surface of the liquid, and a connecting tube with parallel sidearm fitted with a thermometer and an addition funnel with a pressure equalizing arm.

In the flask were placed 833 ml. of methanol and 833 ml. (11.7 moles) of concentrated ammonium hydroxide. The solution was cooled to −5° C. and then saturated with hydrogen sulfide at −5° to +5° C. Continuing to pass hydrogen sulfide slowly into the solution 750 g. (5 moles) of ethyl 2-mercaptoethylcarbonate was added in portions over a 30-minute period. During the addition the temperature was maintained at 5–10° C. Hydrogen sulfide was passed into the mixture for 2 hours after the addition was complete. The mixture was stirred for 20 hours at 25° C.

The mixture was cooled to 0° C. and made acid to Congo paper with concentrated hydrochloric acid. The product was extracted with four 250-ml. portions of chloroform, which was combined and dried over anhydrous magnesium sulfate. After filtering, the chloroform was removed by distillation. The product was distilled through a 2.5 x 16 cm. glass helices-packed column at atmospheric pressure to give a yield of 363 g. (77.2 percent) of 1,2-ethanedithiol, B.P. 145–6° C., $n_D^{25}$ 1.5554–1.5558.

*Example 2*

Three hundred and ninety-two grams of KOH was dissolved in 1 l. of methanol. The solution was saturated with $H_2S$ at 15° C. Two moles (300 g.) of ethyl 2-mercaptoethylcarbonate was then added and the solution allowed to warm up to room temperature (20–25° C.). It was stirred under these conditions for 18 hours and then poured on to 2 l. of crushed ice and acidified with aqueous HCl. The product was extracted 3 times with 500 ml. portions of ether, the ether layer dried over $MgSO_4$ and distilled through a 12-inch Vigreux column. Yield 129 g. (68.6 percent) of 1,2-ethanedithiol, B.P. 143–148° C., $n_D^{25}$ 1.5527.

Comparison of the above results of the invention with those obtained with other mercaptoethylating agents further confirms the outstanding efficacy of the process of the invention for producing 1,2-ethanedithiol. For example, we have found that when ethylene monothiolcarbonate

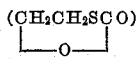

was substituted in the process of the invention, the first step as illustrated by reaction Equation 1) was incomplete and as a result, the residual monothiolcarbonate was thermally decomposed during the separation step of distillation and polyethylene sulfide collected in the distillation column. Also the 1,2-ethanedithiol which formed was found to be somewhat impure as indicated by low sulfur content, low refractive index and a trace of hydroxyl group as shown by infrared analysis. The yield by this process was approximately 46 percent of poor quality 1,2-ethanedithiol.

When 2-mercaptoethylacetate ($CH_3COOCH_2CH_2SH$) was substituted as the mercaptoethylating agent, the reaction product distilled poorly. Fractions were indefinite and not constant boiling. The yield of 1,2-ethanedithiol was only 16 percent, and this had a purity of just 98.3 percent. Also, considerable unreacted 2-mercaptoethylacetate was recovered, again indicating its incomplete conversion to ethylene sulfide.

When ethyl 2-hydroxyethylthiolcarbonate

[$C_2H_5OC(O)SCH_2CH_2OH$]

was substituted as the mercaptoethylating agent, the product therefrom also distilled poorly with indefinite fractions. Consequently, no fraction was separated that could be definitely identified as being just 1,2-ethanedithiol. Infrared analysis indicated a strong hydroxyl band in the fraction designated 2, and poor sulfur analysis for the 1,2-ethanedithiol indicated the presence therein of a substantial amount of 2-mercaptoethanol. This result was not surprising because it was found that ethyl 2-hydroxyethylthiolcarbonate cleaves in the presence of a base to mercaptoethanol. Some unreacted ethyl 2-hydroxyethylthiolcarbonate was also recovered, again indicating poor conversion to the intermediate ethylene sulfide. The use of KOH instead of $NH_4OH$ showed no improvement.

Likewise, when 2-mercaptoethyl-N-n-butyl carbamate ($C_4H_9NHCOOCH_2CH_2SH$) was substituted as the mercaptoethylating agent, it was found that no conversion thereof to ethylene sulfide took place under the conditions of the reaction. When the pH was raised to the point where ethylene sulfide was generated, the only products isolated were low molecular weight polymers which may be termed telomers of the general structure $$C_4H_9NH(CH_2CH_2S)_nH$$

where $n$ is 1–9.

Although the invention has been illustrated in the examples by just ethyl 2-mercaptoethylcarbonate, it will be understood that any other of the mentioned alkyl 2-mercaptoethylcarbonates can be substituted in the examples to give generally similar results, i.e. 1,2-ethanedithiol of better than 99 percent purity and in yields of 68–80 percent.

The invention has been described in detail with particular reference to preferred embodiments thereof, but it will be understood that variations and modifications can be effected within the spirit and scope of the invention as described hereinabove and as defined in the appended claims.

What we claim is:

1. A process for preparing 1,2-ethanedithiol which comprises reacting a carbonate of the general formula

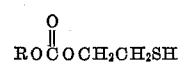

wherein R represents an alkyl group of from 1–8 carbon atoms, with a hydrosulfide of the general formula MSH wherein M represents a member selected from the group consisting of the $NH_4$ radical and an alkali-metal atom, at from 0–30° C., in the presence of a base having the general formula MOH wherein M is as above defined, in the proportions of from 1–5 moles of the said hydrosulfide to each mole of the said carbonate, until the reaction is substantially complete, and acidifying the reaction mixture.

2. A process for preparing 1,2-ethanedithol which comprises reacting ethyl 2-mercaptoethylcarbonate with ammonium hydrosulfide, at from 0–30° C., in the presence of ammonium hydroxide, in the proportions of from 1–5 moles of the said ethyl 2-mercaptoethylcarbonate to each mole of the said ammonium hydrosulfide, until the reaction is substantially complete, followed by acidifying the reaction mixture with hydrochloric acid, and separating the 1,2-ethanedithiol from the reaction mixture.

3. The process of claim 2 wherein hydrogen sulfide gas is passed into the reaction mixture prior to the acidifying step.

4. A process for preparing 1,2-ethanedithiol which comprises reacting ethyl 2-mercaptoethylcarbonate with potassium hydrosulfide, at from 0–30° C., in the presence of potassium hydroxide, in the proportions of from 1–5 moles of the said ethyl 2-mercaptoethylcarbonate to each mole of the said potassium hydrosulfide, until the reaction is substantially complete, followed by acidifying the reaction mixture with hydrochloric acid, and separating the 1,2-ethanedithiol from the reaction mixture.

5. The process of claim 1 wherein the said hydrosulfide MSH is formed in situ by saturating the base containing reaction mixture with hydrogen sulfide gas.

No references cited.